Oct. 2, 1945.  M. C. WILLS  2,386,025
MOUNTING FOR ROAD ROLLERS AND SIMILAR DEVICES
Filed Oct. 9, 1942  4 Sheets-Sheet 1
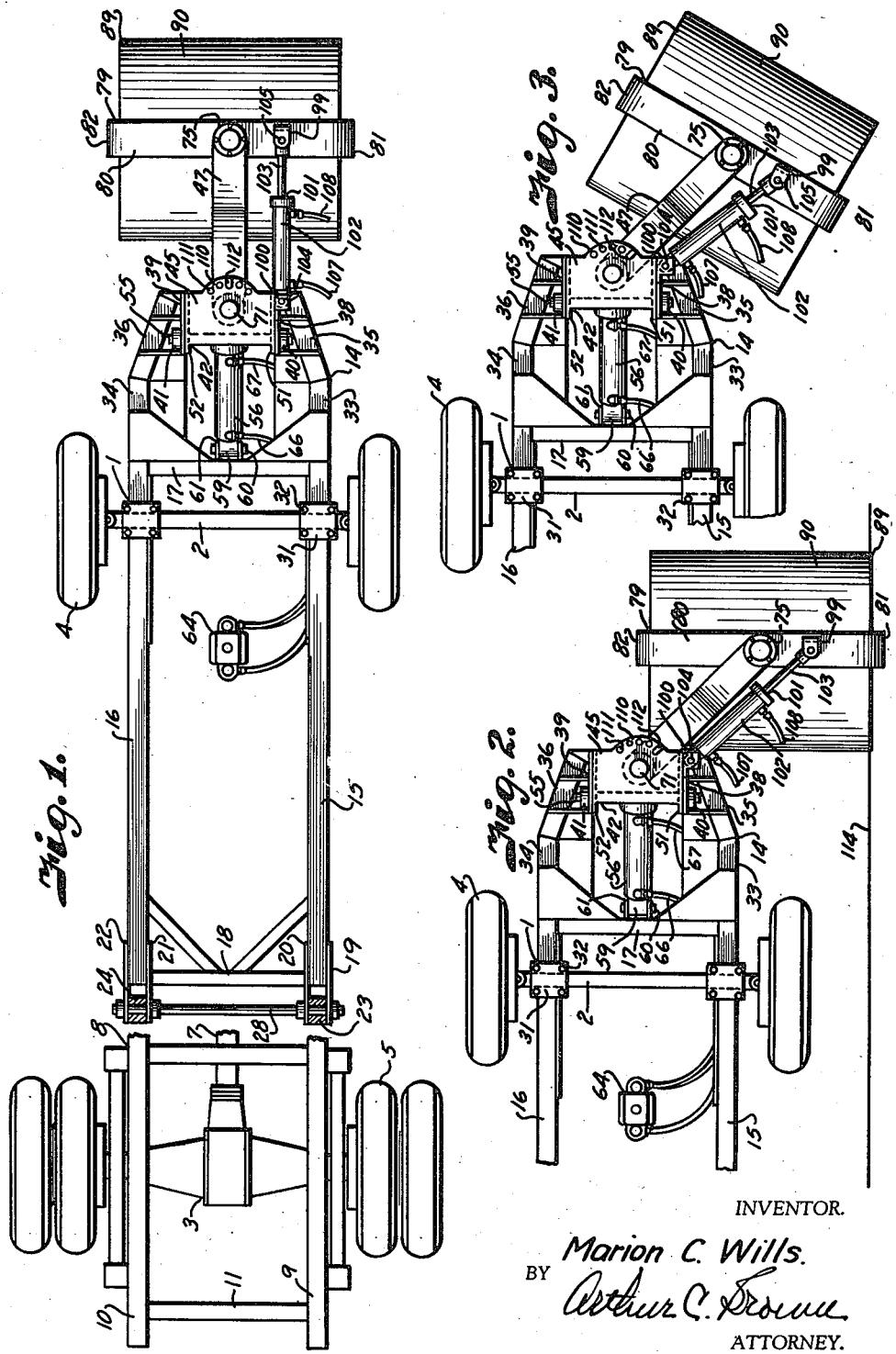
INVENTOR.
Marion C. Wills.
BY Arthur C. Brown
ATTORNEY.

Oct. 2, 1945.　　　　M. C. WILLS　　　　2,386,025
MOUNTING FOR ROAD ROLLERS AND SIMILAR DEVICES
Filed Oct. 9, 1942　　　　4 Sheets-Sheet 2
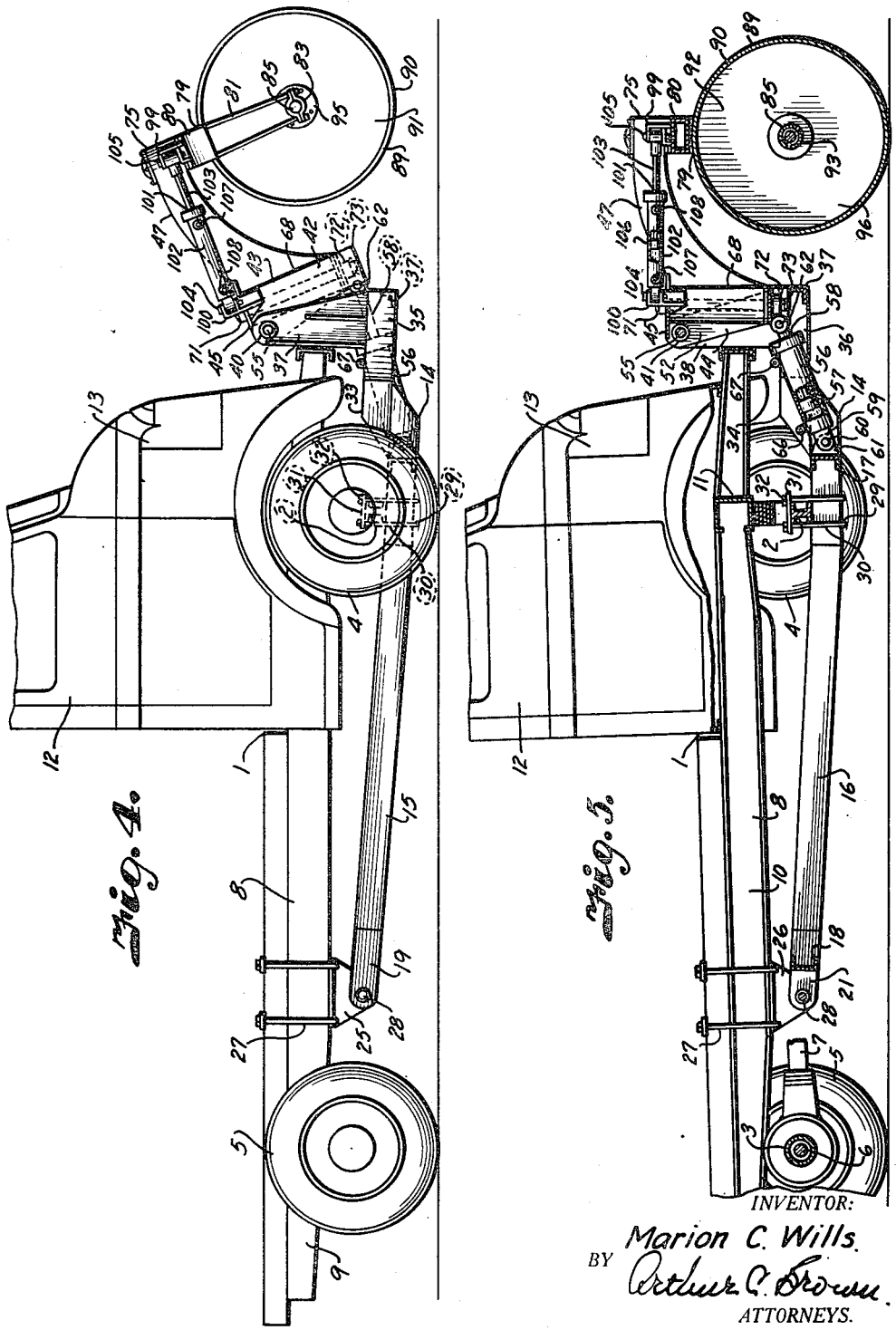
INVENTOR:
Marion C. Wills.
BY Arthur C. Brown
ATTORNEYS.

Oct. 2, 1945.  M. C. WILLS  2,386,025
MOUNTING FOR ROAD ROLLERS AND SIMILAR DEVICES
Filed Oct. 9, 1942  4 Sheets-Sheet 3
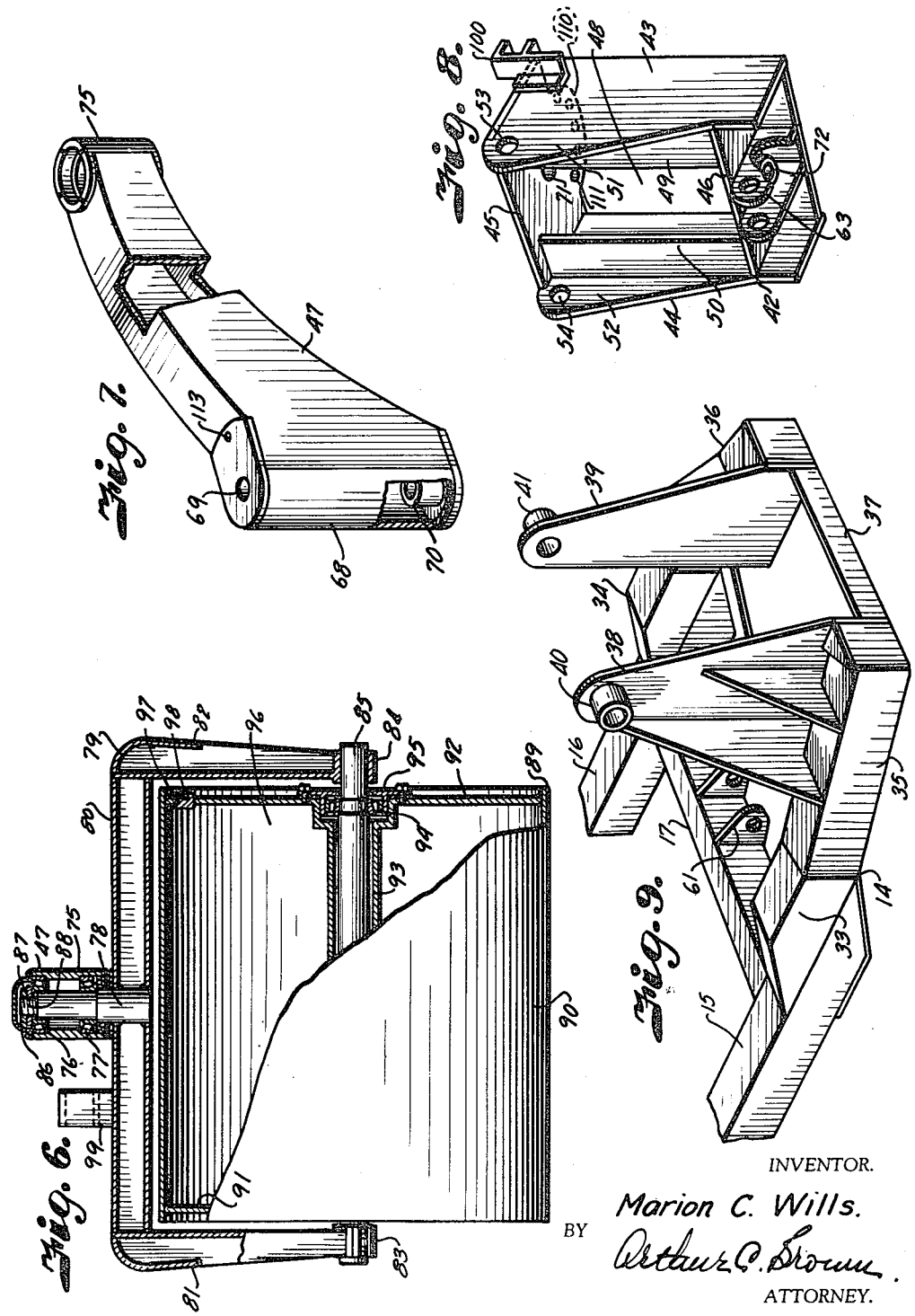
INVENTOR.
Marion C. Wills.
BY
ATTORNEY.

Oct. 2, 1945.   M. C. WILLS   2,386,025
MOUNTING FOR ROAD ROLLERS AND SIMILAR DEVICES
Filed Oct. 9, 1942   4 Sheets-Sheet 4
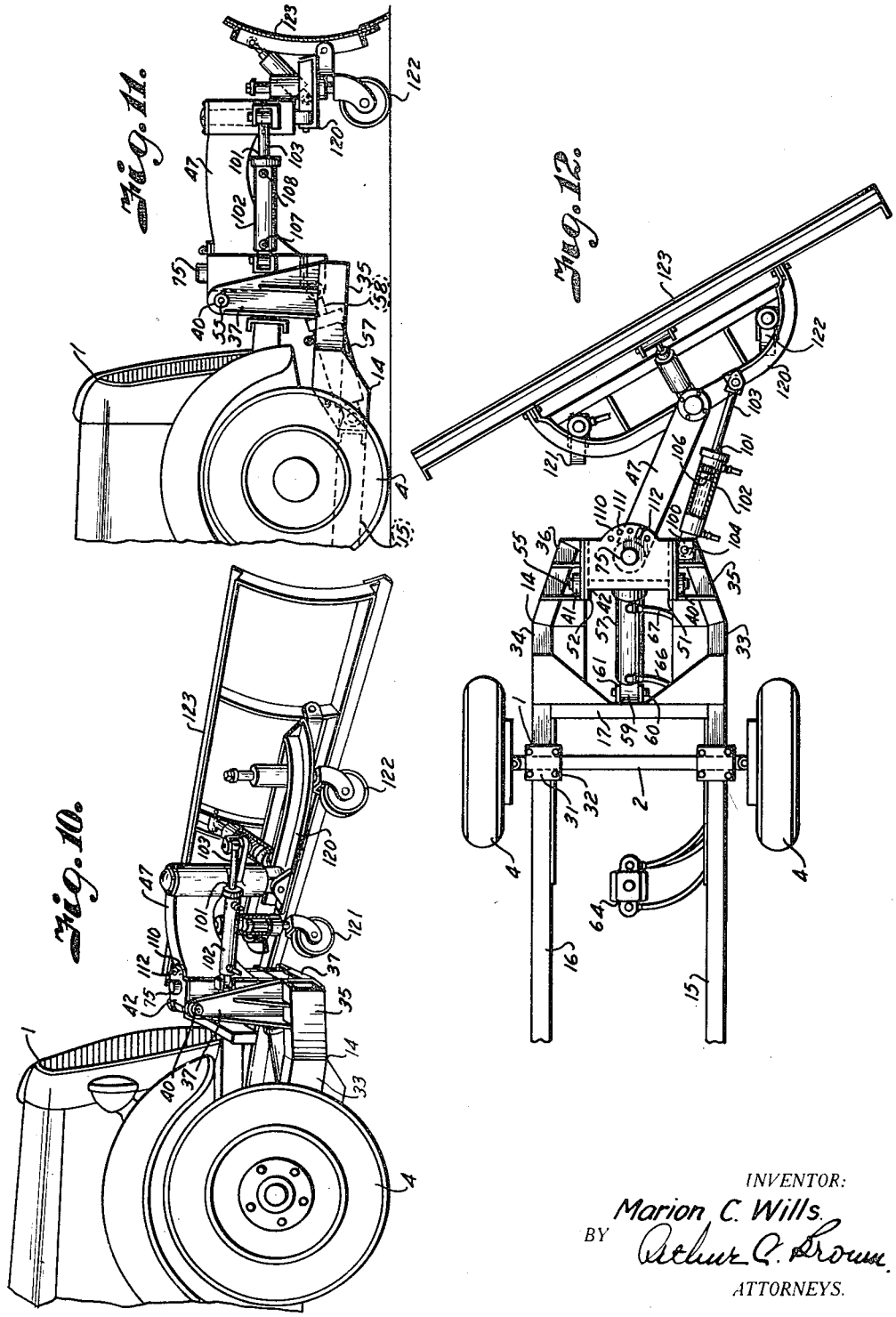
INVENTOR:
Marion C. Wills.
BY
ATTORNEYS.

Patented Oct. 2, 1945

2,386,025

UNITED STATES PATENT OFFICE 2,386,025

MOUNTING FOR ROAD ROLLERS AND SIMILAR DEVICES

Marion C. Wills, Topeka, Kans., assignor to Standard Steel Works, North Kansas City, Mo., a corporation of Missouri Application October 9, 1942, Serial No. 461,390

9 Claims. (Cl. 94—50)

This invention relates to a mounting for road rollers and similar accessory devices on the front of a motor vehicle such as a truck or tractor, and has for its principal objects to provide a mounting whereby various accessory devices may be attached and removed from the vehicle; to provide a mounting whereby weight of the vehicle may be utilized in enhancing efficiency of the accessory equipment; to provide a mounting whereby the accessory device may be offset laterally with respect to the path of travel of the carrying vehicle; to provide a mounting with hydraulic controls for operation by the operator of the vehicle; to provide a structure which gives the operator of the vehicle full view of the accessory device; to provide a mounting which permits steering of the accessory device carried thereby; and to provide a mounting of strong, light weight construction so that it does not interfere with use of the vehicle when the mounting is attached thereon.

In accomplishing these and other objects of the invention, as hereinafter pointed out, I have provided improved structure, the preferred form of which is illustrated in the accompanying drawings, wherein:

Fig. 1 is a plan view of the chassis of a truck, partly broken away to better illustrate the mounting embodying the features of the invention, the mounting being shown as carrying a road roller.

Fig. 2 is a plan view of the front of the truck showing position of the mounting which offsets the roller with respect to forward travel of the truck.

Fig. 3 is a fragmentary plan view of the front of the truck showing the method of steering the road roller.

Fig. 4 is a side elevational view of the truck and mounting attached thereto, the roller being shown in elevated or transporting position.

Fig. 5 is a similar view, partly in section, but showing the roller and truck in road rolling position.

Fig. 6 is an enlarged front view of the road roller and its carrying yoke, parts of which are shown in section to better illustrate the construction.

Fig. 7 is a perspective view of the neck member of the mounting with parts thereof broken away to illustrate construction thereof.

Fig. 8 is a perspective view of the neck member pivot frame.

Fig. 9 is a perspective view of the front portion of the main frame of the mounting.

Fig. 10 is a perspective view of the mounting when a snow plow is attached thereto in place of the road roller illustrated in the other figures of the invention.

Fig. 11 is a side elevational view of the arrangement shown in Fig. 10, the mold board of the plow being shown in vertical section.

Fig. 12 is a plan view of the arrangement shown in Fig. 10.

Referring more in detail to the drawings:

I designates a vehicle, for example an ordinary motor truck, on which the invention is mounted for attachment of various road working devices, such as a roller, broom, material spreader, scraper, snow plow, or the like, as later described. In the illustrated instance the truck is of standard type and includes front and rear axles 2 and 3 carried by front and rear wheels 4 and 5, the front wheels 4 being pivotally mounted on the ends of the axle 2 to steer the truck and the rear wheels being connected with driving axles 6 that are operated through a propeller shaft 7. Carried on the axles by the usual spring mountings is a chassis frame 8 comprising longitudinal members 9 and 10 connected by cross members 11. Carried on the front of the frame is the operator's cab 12 and a motor indicated by the hood 13 and which motor is operatively connected with the propeller shaft 7 to drive the rear wheels 5.

Attached to the vehicle is the accessory mounting embodying the features of the present invention. The mounting includes a main frame 14, comprising side arms 15 and 16 arranged longitudinally under the truck frame and connected at the ends by front and rear cross members 17 and 18. Attached to the rear ends of the arms 15 and 16 are pairs of plates 19—20 and 21—22 forming yokes to accommodate bearing portions 23 and 24 of push brackets 25 and 26. The push brackets 25 and 26 are attached to the under sides of the frame members 9 and 10 of the truck by bolts 27 at a point in front of the rear axle 3, as illustrated in Figs. 4 and 5. The yokes on the rear ends of the arms 15 and 16 are pivotally connected with push brackets 25 and 26 by a cross-shaft 28 having its ends extended through the pairs of plates 19—20 and 21—22 and journalled in the bearing portions 23 and 24 of the push brackets. The forward ends of the arms extend below the front axle 2 to terminate short of the front end of the vehicle frame, and are secured to the axle 4 by U-bolts 29 having shanks 30 thereof extending through plates 31 supported on the upper face of the axle and which cooperate with the bar portions of the U-bolts to clamp the side arms against the axle upon application of nuts 32. It is thus obvious that while the main frame is clamped to the front axle, it is free to pivot on the shaft 28 responsive to relative movement between the front axle and the chassis frame of the vehicle.

The front ends of the side arms extend a short distance in front of the foremost cross member 17, and fixed thereupon are extensions 33 and 34 having slightly converging terminals 35 and 36 connected by a cross-bar 37. The extensions, being mounted upon the upper faces of the arms 15 and 16, provide greater ground clearance at the front end of the main frame, as shown in Fig. 4.

Fixed upon the terminals 35 and 36 are upwardly extending brackets 38 and 39, having bearings 40 and 41 at their upper ends, which clear the foremost cross member of the chassis frame and mount therebetween a neck pivot frame 42, best illustrated in Fig. 8.

The pivot frame includes sides 43 and 44, a top 45, and an upwardly inset bottom 46 forming a substantially rectangular frame to mount a neck member 47 therein as later described. The front portion of the frame is open as indicated at 48 but the rear side of the frame is partially closed by plates 49 and 50 extending inwardly from the sides 43 and 44 and from the bottom 46 to the top 45 for enhancing rigidity of the frame member. The sides 43 and 44 have rearwardly extending wing portions 51 and 52 provided with bearing openings 53 and 54 at their upper rear corners to cooperate with the bearings 40 and 41 passing a shaft 55 therethrough for pivotally suspending the neck frame member between the brackets 38 and 39.

The frame member is operated by a hoisting mechanism which, in the illustrated instance, includes a hydraulic cylinder 56 and in which is slidably mounted a piston 57 to actuate a piston rod 58. In the illustrated instance, the rear end of the cylinder 56 is provided with ears 59 that are pivotally connected by pins 60 with ears 61 attached to the cross member 18 of the frame 14, as best shown in Figs. 1, 2, 3 and 5. The front end of the piston rod 18 is pivotally connected by a pin 62 having its ends mounted in ears 63 projecting rearwardly from the neck frame and located below the bottom 46 thereof as clearly shown in Fig. 8.

The piston 57 is adapted to be operated under fluid pressure supplied from a pump indicated at 64, which is operatively connected with the engine of the truck in any conventional manner, the pump being provided with a control valve 65 operable from the driver's position in the cab 12 so that fluid may be selectively admitted to the respective ends of the cylinder through hose connections 66 and 67.

The neck member 47 previously mentioned is best illustrated in Fig. 7 and includes a base portion 68 corresponding in height to the space between the top 45 and bottom 46 of the carrying frame 42. Provided in the base portion 68 are bearings 69 and 70 registering with complementary bearings 71 and 72 attached to the bottom and top 45 and 46 of the frame for mounting a king pin 73 whereby the neck is adapted to swing from a position forwardly of the truck to lateral positions as illustrated in Figs. 2 and 3 whereby the road working device, for example a road roller 74, may be offset with respect to the forward travel of the truck, as later described. The neck member curves upwardly and forwardly from the base portion thereof and terminates in a cylindrical sleeve 75 having the axis thereof extending parallel with the axis of the king pin.

Mounted in the sleeve member are antifriction bearings 76 and 77 to journal a spindle 78 of a yoke 79. The yoke 79 includes a bar portion 80 carrying the spindle 78 and having depending arms 81 and 82 at the ends thereof carrying bearings 83 and 84 which mount the ends of a roller shaft 85. The cross bar 80 of the yoke turns against the lower face of the sleeve member and is kept in contact therewith by nuts 86 and 87 threaded on a reduced extension 88 of the spindle, as shown in Fig. 6. The shaft 85 may carry a rotary road working device such as a roller 89, which includes a hollow cylinder 90 closed at the ends by heads 91 and 92. Extending between the heads, axially of the cylinder, is a sleeve 93 of larger diameter than the shaft 85 and which is formed at the ends to accommodate antifriction bearings 94 as shown in Fig. 6, the bearings being retained by plates 95 suitably attached to the outer sides of the heads 91 and 92 of the roller. The roller is preferably constructed so that the space therein forms a liquid-tight chamber 96 adapted to contain a loading liquid, such as water, which is admitted through an opening 97 in the head 92, the opening being closed by a plug 98 threaded therein, as shown in Fig. 6. In order to turn the roller about the axis of the spindle to steer the roller when in rolling position, the cross bar 80 is provided at a point spaced from the sleeve portion of the neck member with a bracket 99 which cooperates with a bracket 100 on the carrying frame to mount a hoist mechanism 101 therebetween which, in the illustrated instance, is shown as including a cylinder 102 and a piston rod 103, the cylinder being pivotally connected with the bracket 100 by a pin 104 and the forward end of the piston rod being connected with the bracket 99 by a similar pin 105.

Connected with the rod 103 and slidably mounted in the cylinder is a piston 106 which is adapted to be reciprocated by pressure fluid supplied from the pump 64 under control of the operator of the vehicle through hose 107 and 108 connecting the respective ends of the cylinder 106 with a suitable control valve (not shown) that is connected with the high and low pressure sides of the pump. In order that the neck 47 may be carried at any selected angle relative to the forward travel of the truck, the top 45 of the neck carrying frame has a forwardly extending arcuate wing 110 provided with a series of openings 111 to receive a pin 112 that is adapted to be placed in any one of the openings so that the end thereof engages in a socket 113 provided in the base portion 68 of the neck member 47 as best shown in Fig. 7.

In rolling a roadway or a patch therein, the roller is attached to the mounting and carried by the truck to the site of rolling operation with the roller in the elevated position illustrated in Fig. 4 whereby the roller clears the surface of the highway and the front wheels of the truck are used as the steering wheels. The roller is held in transporting position as shown by trapping pressure in the rear end of the hydraulic cylinder 56. When the pressure is released from the rear end of the cylinder and admitted to the front end of the cylinder the roller is brought in contact with the surface to be rolled. Continued admission of pressure raises the front wheels of the truck from the road as shown in Fig. 5 so that a portion of the weight of the truck is applied on the roller to provide the necessary rolling pressure. The truck may then be manipulated to move the roller back and forth across the surface to be rolled. If greater pressure is desired the roller may be filled with the weighting liquid, such as water, by removing the threaded plug 98 and filling the roller chamber through the opening 97. During the rolling operation, the roller is steered by the hydraulic hoist 101 through controlling admission of pressure fluid to the respective ends of the cylinder so that the roller yoke journals within the forward end of the carrying arm. Since the forward end of the truck is supported on the roller, the roller now substitutes for the steering wheels of the truck.

If it is desired to roll a patch near a curbing and to keep the truck near the center of a roadway, the pin is removed from the central aperture and the neck member is swung to the side on which the roller is to be offset, for example to the position shown in Fig. 2. The pin is then replaced through a selected aperture and engaged in the socket 112 to retain the neck in the desired position. In this position the end of the roller may operate in close relation to the curbing or the like as indicated by the line 114, Fig. 2. The roller is steered in this position as shown in Fig. 3. When the rolling operation is complete, the roller mechanism may be readily disconnected from its mounting on the truck by removal of the shaft 55 and disconnection of the hydraulic hoists. The main carrying frame remains on the truck so that it is not necessary to disconnect the mounting.

It is obvious that other devices may be readily attached to the mounting means, for example the snow scraper illustrated in Figs. 10 to 12 inclusive. In this instance the neck member journals the spindle of a frame 120 supported on castor wheels 121 and 122. The frame 120 carries a blade or mold board 123 which extends transversely of the forward end of the truck and is adapted to be pivoted on the neck member 47 through connection of the hydraulic hoist 101 with an arm 124 carried by the frame 120. It is thus obvious that through manipulation of the hoist the mold board may be adjusted to various angular positions with respect to forward travel of the truck. It is also obvious that upon removal of the retaining pin 112 the frame 120 and mold board carried thereby may be offset laterally with respect to the forward travel of the truck.

When a road working device of this character is used, the lifting hoist is adjusted so that the castors 121 and 122 support the mold board, however, the mold board is readily lifted from the surface of the roadway through the hoist 56 so that the mold board may be quickly moved to and from the site of operation. It is obvious that other devices, such as scrapers, material spreaders, cylindrical brooms and the like, may be substituted for the road working devices illustrated, without departing from the spirit of the invention.

What I claim and desire to secure by Letters Patent is:

1. A device of the character described including, an attaching frame adapted for attachment to the chassis of a vehicle, a frame member, means pivoting the frame member on the attaching frame for swinging movement about a horizontal axis, a neck-like tool carrying member, means connecting the neck-like tool carrying member with the frame member to swing about a vertical axis, a road working tool pivotally connected with said neck-like member to swing about a vertical axis, latch means connecting the neck-like tool carrying member at a selected angular position relative to the first-mentioned vertical axis, and a hoist connecting the frame member with the attaching frame to swing the frame member on the attaching frame for raising and lowering the tool carrying member.

2. A device of the character described including, a main frame adapted for attachment to the chassis of a vehicle, a frame member, means pivoting the frame member on the main frame for swinging movement about a horizontal axis, a neck member, vertical pivoting means connecting the neck member with the frame member to swing in an arc about a vertical axis, latch means for fixing the neck member at a selected angular position relative to the vertical axis, a road roller, substantially vertically arranged pivoting means for turning the road roller about a substantially vertical axis on said neck member, a hoist for swinging the frame member on said horizontal axis for raising and lowering the road roller to and from contact with a surface to be rolled, and means for turning the road roller on said substantially vertical axis to steer the vehicle when the road roller is in contact with the surface to be rolled.

3. In combination with a vehicle having a frame, front and rear axles, and front and rear wheels carrying the axles, an attachment for said vehicle including a main frame positioned below the frame of the vehicle and extending forwardly therefrom, means pivotally connecting the rear end of the main frame of said attachment to the vehicle frame at points between the front and rear wheels, means connecting the main frame with the front axle, a road working device, a pivot frame having pivotal mounting on the forward end of said main frame for swinging movement about a horizontally positioned axis, a neck member having pivotal mounting on the pivot frame about a vertical axis, hoist means for swinging the road working device with respect to said horizontal axis, latch means for selectively retaining the road working device at a selected angle relatively to said vertical axis, means for pivoting the road working device on a steering axis, and hydraulic means for steering the road working device to guide the machine.

4. In combination with a vehicle having front steering wheels, a road working device, means mounting the road working device on the vehicle in front of the steering wheels, means for selectively applying a portion of the weight of the vehicle upon said road working device, and steering means for the road working means to guide the vehicle when weight of the vehicle is applied to the road working device.

5. In combination with a carrying vehicle having steering wheels, a frame, means for attaching the frame to the vehicle with a portion thereof extending forwardly of the steering wheels of the vehicle, a road working device, and means connecting the road working device to the projecting end of the frame for swinging movement about a vertical axis forwardly of the steering wheels to laterally offset the road working device with respect to said steering wheels of the vehicle, said road working device being provided with steering means to guide the vehicle.

6. In combination with a carrying vehicle having a frame, a front axle and front steering wheels on the axle, an attachment frame arranged below the vehicle frame, means for pivotally connecting the rear of the attachment frame to the vehicle, said attachment frame having a forward portion terminating in front of the vehicle, means connecting said forward portion of the attachment frame to the front axle of the vehicle, a road working device, means connecting the road working device to said forward portion of the attachment frame for swinging movement about a vertical axis to laterally offset the road working device with respect to forward travel of the vehicle, means for selectively applying a portion of the weight of the vehicle on the road working device, and means for steering the road working device independently of the front wheels of the vehicle.

7. In combination with a vehicle having front steering wheels, a road roller, means connecting the road roller with the vehicle in front of said steering wheels, means for raising the front steering wheels of the vehicle relative to the road roller for transferring a portion of the weight of the vehicle upon said road roller, means for selectively offsetting the road roller laterally with respect to the steering wheels of the vehicle, and means for bodily steering the road roller to guide the vehicle when weight of the vehicle is transferred to said road roller.

8. In combination with a vehicle having a frame, front and rear axles and front and rear wheels carrying the axles, an attachment for said vehicle including a main frame positioned below the frame of the vehicle and extending forwardly therefrom, means horizontally pivoting the rear end of the main frame of said attachment with the vehicle frame at points between the front and rear wheels, means connecting the main frame with the front axle of the vehicle, a road working device, a neck member connecting the road working device with the forward end of said main frame, means pivoting the neck member on the frame for swinging movement above vertically and horizontally positioned axes forwardly of said front axle, means pivotally connecting the road working device with the neck member for movement about a vertical axis on the neck member, and hoist means for swinging the road working device with respect to said horizontal axis into contact with a surface to be worked, said hoist means being adapted to be actuated from the driver's position of said vehicle.

9. In combination with a vehicle having a frame, front and rear axles and front and rear wheels carrying the axles, an attachment for said vehicle including a main frame positioned below the frame of the vehicle and extending forwardly therefrom, means pivotally connecting the rear end of the main frame of said attachment to the vehicle frame at points between the front and rear wheels, means connecting the main frame with the front axle, a road working device, a neck member connecting the road working device with the forward end of said main frame, means pivoting the neck member on the frame for swinging movement about vertically and horizontally positioned axes forwardly of said front axle, means pivotally connecting the road working device with the neck member for movement about a vertical axis on the neck member, hoist means for swinging the road working device with respect to said horizontal axis, said hoist means being adapted to be actuated from the driver's position of said vehicle, and latch means for selectively retaining the neck member at a selected angle relative to the vertical axis about which said neck member swings.

MARION C. WILLS.